(12) United States Patent
Vlachogiannis et al.

(10) Patent No.: US 11,711,432 B1
(45) Date of Patent: *Jul. 25, 2023

(54) REMOTE MANAGEMENT OF APPLICATION SETTINGS

(71) Applicant: SPLUNK Inc., San Francisco, CA (US)

(72) Inventors: Ioannis Vlachogiannis, San Francisco, CA (US); Nikolaos Maroulis, Oakland, CA (US); Panagiotis Papadomitsos, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,925

(22) Filed: Jan. 13, 2022

Related U.S. Application Data

(63) Continuation of application No. 16/775,700, filed on Jan. 29, 2020, now Pat. No. 11,240,348, which is a continuation of application No. 14/528,526, filed on Oct. 30, 2014, now Pat. No. 10,554,788.

(60) Provisional application No. 62/053,102, filed on Sep. 19, 2014.

(51) Int. Cl.
| | |
|---|---|
| *H04L 67/133* | (2022.01) |
| *H04L 41/5009* | (2022.01) |
| *H04L 41/0873* | (2022.01) |
| *G06F 8/60* | (2018.01) |
| *H04L 67/00* | (2022.01) |

(52) U.S. Cl.
CPC ............ *H04L 67/133* (2022.05); *G06F 8/60* (2013.01); *H04L 41/0873* (2013.01); *H04L 41/5012* (2013.01); *H04L 67/34* (2013.01)

(58) Field of Classification Search
CPC ... G06F 8/60; G06F 8/65; H04L 41/08; H04L 67/34
See application file for complete search history.

(56) References Cited

U.S. PATENT DOCUMENTS

| | | | | |
|---|---|---|---|---|
| 7,506,309 | B2 * | 3/2009 | Schaefer | G07C 5/008 |
| | | | | 701/31.4 |
| 7,933,668 | B2 * | 4/2011 | Braun | G05B 19/042 |
| | | | | 700/83 |

(Continued)

*Primary Examiner* — Shean Tokuta
(74) *Attorney, Agent, or Firm* — Shook, Hardy & Bacon L.L.P.

(57) ABSTRACT

In various implementations, a computer-implemented method for remotely managing settings of applications includes receiving a network communication from a managed device, the received network communication including a client-side hash value. The method further includes identifying settings for an application on the managed device in response to the receiving of the network communication, where the identified settings include configuration instructions for the application. Based on a comparison between the received client-side hash value and a server-side hash value that corresponds to the identified settings, at least some of the identified settings are transmitted to the managed device. The transmitting of at least some of the identified settings can be based on the comparison indicating a mismatch between the received client-side hash value and the server-side hash value. The method may also include completing processing of the received network communication after the transmitting of the at least some of the identified settings.

20 Claims, 6 Drawing Sheets

(56) References Cited

U.S. PATENT DOCUMENTS

| | | | |
|---|---|---|---|
| 8,184,811 B1* | 5/2012 | Patten | H04W 12/10 380/247 |
| 9,015,296 B2* | 4/2015 | Mattila | H04L 41/024 709/223 |
| 9,158,526 B1* | 10/2015 | Nguyen | G06F 8/65 |
| 10,554,788 B2* | 2/2020 | Vlachogiannis | H04L 67/133 |
| 2007/0093926 A1* | 4/2007 | D. Braun | G05B 19/042 700/112 |
| 2008/0215722 A1* | 9/2008 | Hogaboom | H04L 9/40 709/224 |
| 2008/0235790 A1 | 9/2008 | Malhotra et al. | |
| 2009/0274139 A1* | 11/2009 | Palanki | H04L 1/1854 370/349 |
| 2010/0112997 A1 | 5/2010 | Roundtree | |
| 2010/0333081 A1* | 12/2010 | Etchegoyen | G06F 8/60 717/172 |
| 2011/0286356 A1* | 11/2011 | Tenny | H04W 24/10 370/254 |
| 2012/0066034 A1 | 3/2012 | Nolan | |
| 2012/0124567 A1 | 5/2012 | Landry | |
| 2012/0204232 A1 | 8/2012 | Michael et al. | |
| 2012/0209974 A1* | 8/2012 | Igarashi | H04L 41/046 709/223 |
| 2012/0239821 A1* | 9/2012 | Hozumi | H04L 67/125 709/238 |
| 2012/0303476 A1* | 11/2012 | Krzyzanowski | G06F 16/00 705/26.61 |
| 2012/0331526 A1 | 12/2012 | Caudle et al. | |
| 2013/0078946 A1 | 3/2013 | Pecen et al. | |
| 2013/0103749 A1* | 4/2013 | Werth | H04L 41/0816 709/203 |
| 2013/0166899 A1 | 6/2013 | Courtney et al. | |
| 2013/0219429 A1* | 8/2013 | Hirsch | H04N 21/485 725/37 |
| 2013/0283305 A1* | 10/2013 | Hirsch | G06F 8/30 725/14 |
| 2013/0324146 A1* | 12/2013 | Ylarakkola | H04W 4/02 455/456.1 |
| 2014/0033193 A1* | 1/2014 | Palaniappan | G06F 21/57 713/176 |
| 2014/0047429 A1* | 2/2014 | Gaither | G06F 9/44526 717/172 |
| 2014/0082158 A1 | 3/2014 | Yin et al. | |
| 2014/0337528 A1* | 11/2014 | Barton | G06F 21/72 709/225 |
| 2014/0379811 A1 | 12/2014 | Chan et al. | |
| 2015/0019991 A1* | 1/2015 | Kristj | H04L 41/0853 715/747 |
| 2016/0087855 A1* | 3/2016 | Vlachogiannis | H04L 67/34 709/223 |
| 2017/0187835 A1* | 6/2017 | Lim | H04L 43/0805 |
| 2017/0286059 A1* | 10/2017 | Dion | H04N 21/4755 |
| 2020/0169620 A1* | 5/2020 | Vlachogiannis | H04L 67/133 |

* cited by examiner

REMOTE MANAGEMENT OF APPLICATION SETTINGS

CROSS-REFERENCE TO RELATED APPLICATIONS

This application is a Continuation of U.S. patent application Ser. No. 16/775,700 filed Jan. 29, 2020, which is itself a Continuation of U.S. patent application Ser. No. 14/528,526 filed Oct. 30, 2014, and now issued as U.S. Pat. No. 10,554,788, which itself claims the benefit of U.S. Provisional Application No. 62/053,102, filed on Sep. 19, 2014, the entire contents of each of the foregoing applications being incorporated by reference herein in their entirety.

BACKGROUND

Smartphones have driven the widespread adoption of application marketplaces. Beyond smartphones, it has become increasingly common for application marketplaces to target other types of computing devices. In this respect, application marketplaces can commonly be found for other types of mobile devices, including tablet computers, laptops, and smartwatches, as well as for desktop computers, and other computing devices. Application marketplaces provide features for managing applications that typically include discovering, downloading, and updating the applications. However, the feature sets of application marketplaces can be limited and typically do not extend beyond basic application distribution. Furthermore, the feature sets can vary between application marketplaces, which can introduce the risk of fragmenting a developer's user base, particularly in the cross-platform environment. As such, developers may seek other application management solutions to overcome any of the various limitations of application marketplaces.

SUMMARY

Embodiments of the present invention are directed to remote management of application settings. Applications can be distributed to managed devices utilizing an application marketplace or another distribution means. Upon an application being installed on a managed device, a developer may wish to modify, add, delete, replace, or otherwise manage one or more settings associated with the application. A remote settings service is described herein that enables remote management of application settings. The remote settings service can facilitate real-time, or near real-time, management of applications installed on managed devices. As a result, settings associated with an application installed on a managed device can be modified without having to reinstall the application or wait an extended period of time for modifications.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

Figure 1:
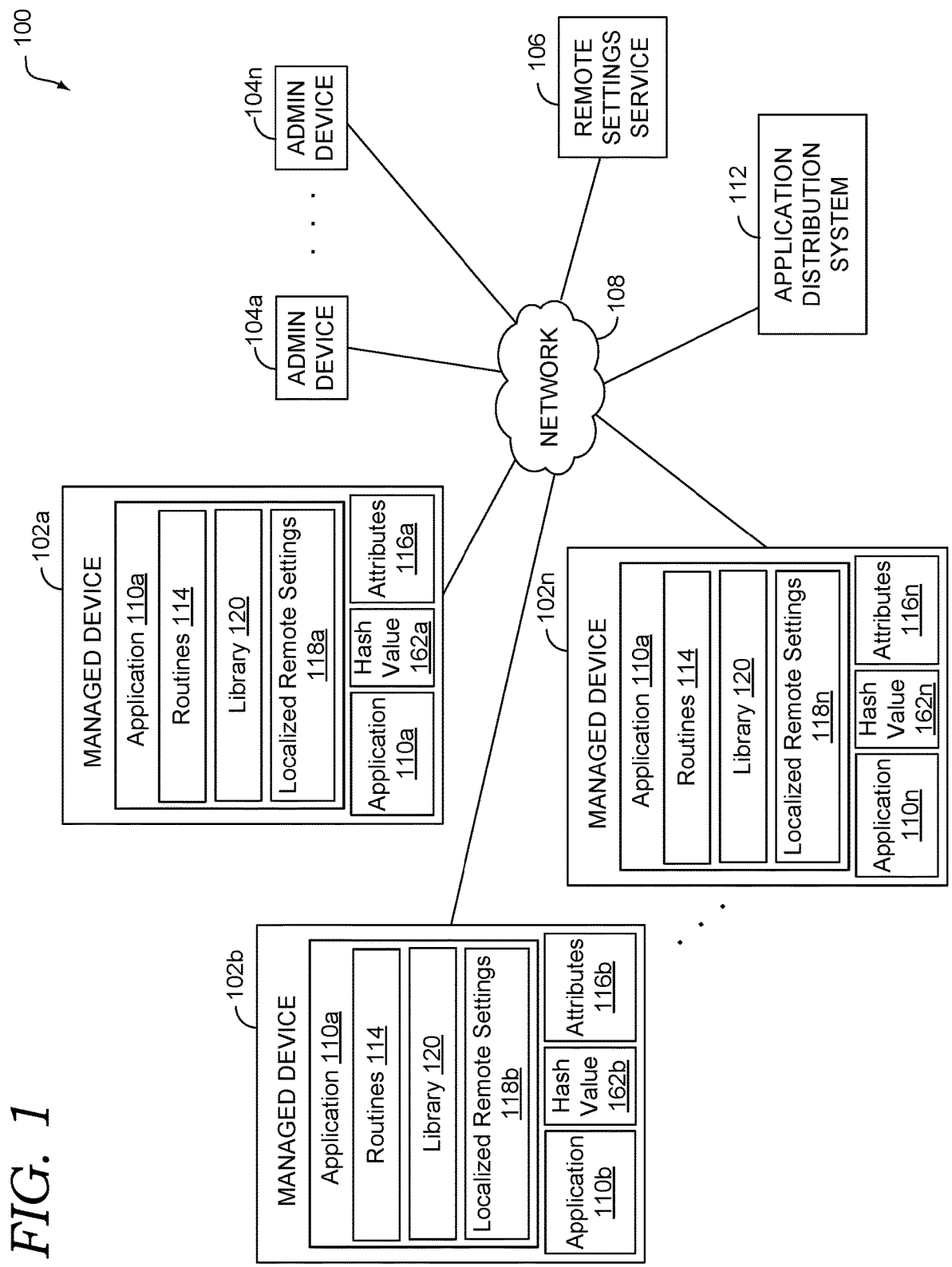
FIG. 1 illustrates an exemplary system which can be utilized for remotely managing settings of applications in accordance with implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A developer may wish to modify or test the behavior of applications after they are installed on devices. While the developer could provide a new version of an application with modifications, this approach is impractical where modifications are brief and temporary, such as in debug and testing. Additionally, the user experience is degraded by requiring download and install of the modified application and the developer is unable to target specific users and/or devices for modifications. In accordance with implementations of the present disclosure, the behavior of installed applications can be modified remotely by modifying settings of the installed applications. The modifications can be performed quickly while being unobtrusive to the user experience. Furthermore, specific devices and/or users can be targeted for different settings.

Accordingly, embodiments of the present invention are directed to remote management of application settings. In some aspects of the present disclosure, a managed device is provided with localized remote settings by a remote settings service. Localized remote settings can correspond to remote settings for applications that are stored on managed devices after having been externally provided to the managed devices. Localized remote settings can be applied to applications by the managed devices. By modifying localized remote settings using a remote settings service, different settings can be applied to the applications by the managed devices so as to remotely manage the settings.

In some implementations, management of remote settings can include evaluating localized remote settings on the managed devices. For example, the localized remote settings associated with an application(s) can be compared to reference remote settings by a remote settings service to check whether or not the localized remote settings correspond to the reference remote settings that are intended to be provided to one or more managed devices for the application(s). If the localized remote settings correspond to the reference remote settings, the remote settings service may refrain from sending or transmitting reference remote settings to the managed device. Otherwise, the remote settings service may send or transmit reference remote settings to the managed device, which can replace one to all of the localized remote settings.

In further aspects of the present disclosure, comparing localized remote settings to reference remote settings can be accomplished by comparing respective hash values that correspond to the localized and reference remote settings. In this respect, a client-side hash value is generated based on localized remote settings for an application on a managed device. The client-side hash value is sent or transmitted from the managed device to the remote settings service in a network communication. The network communication can be sent or transmitted to the remote settings service by the application, for example, as part of a startup routine of the application. In some cases, the network communication is sent or transmitted each time the application starts up, or launches. A server-side hash value is generated based on reference remote settings for the application. The server-side hash value is compared to the client-side hash value received in the network communication. A response to the network communication can be based on results of the comparison.

In certain respects, if the comparison indicates a mismatch between the server-side hash value and the client-side hash value, the remote settings service may send at least some of the reference remote settings to the managed device in a response to the network communication. The managed device may implement any portion of or all of reference remote settings that are received from the remote settings service. Furthermore, any portion of the received reference remote settings may modify or replace the localized remote settings. If the comparison indicates a match between the server-side hash value and the client-side hash value, the remote settings service may refrain from sending at least some of the reference remote settings to the managed device. In some cases, the remote settings service may send a response to the network communication that does not include any of the reference remote settings, for example to close a connection to the managed device.

In other aspects of the present disclosure, one or more specific managed devices, and/or one or more groups of managed devices can be targeted for management of remote settings. A group of managed devices may be defined by the managed devices sharing one or more attributes. By accounting for attributes, managed devices may be sent or transmitted different reference remote settings and have different resultant localized remote settings for the same application. In some cases, the targeting can be accomplished by assigning at least one attribute to at least some settings of reference remote settings, where the attributes correspond to target devices of the at least some settings. A target device for a setting can correspond to a device that is intended to or otherwise designated to implement the setting.

A network communication to a managed device may indicate attributes that are assigned to settings in reference remote settings to the managed device. The network communication may include the at least some settings and the managed device may implement ones of the at least some settings that have attributes corresponding to the managed device. The network communication may include any combination of the at least some settings, the at least some settings that have attributes corresponding to the managed device, and all of the remote settings for an application. Thus, in some cases, the managed device may not implement all of the remote settings that it receives based on whether or not the assigned attributes correspond to the managed device. Doing so can allow for targeted management of remote settings services for managed devices without necessarily having access to attributes of the managed devices at a remote settings service.

In further aspects of the present disclosure, the remote settings service can complete processing of a network communication, such as a network communication that includes a client-side hash value from a managed device, after sending a response to the network communication. For example, the network communication can include encoded payload data and the remote settings service can complete decoding and/or other processing of the encoded payload data after sending the response to the network communication. In this way, local remote settings on managed devices can be managed quickly with minimal impact on the operation of the managed devices.

In further respects, the remote settings service can receive a network communication from a managed device, the received network communication comprising a client-side hash value. The remote settings service can identify settings for an application on the managed device in response to the receiving of the network communication. For example, the settings can be identified based on an application identifier of other information in the network communication and/or based on the managed device that sent the network communication. The identified settings comprise configuration instructions for the application. Based on a comparison between the received client-side hash value and a server-side hash value that corresponds to the identified settings, the remote settings service can transmit at least some of the identified settings to the managed device.

Turning now to FIG. 1, a diagram is provided illustrating an exemplary system 100 in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes a number of managed devices, such as managed devices 102*a* and 102*b* through 102*n*, a number of administrator devices, such as administrator devices 104*a* through 104*n*, remote settings service 106, and application distribution system 112. It should be understood that system 100 shown in FIG. 1 is an example of one suitable computing system. Each of the components shown in FIG. 1 may be implemented utilizing any type of computing device, such as computing device 600, later described with reference to FIG. 6, for example. The components may communicate with each other via network 108, which may include, without limitation, one or more local area networks (LANs) and/or wide area networks (WANs). Such networking environments are commonplace in offices, enterprise-wide computer networks, intranets, cellular networks, and the Internet.

It should be understood that any number of managed devices, administrator devices, application marketplaces, and remote setting services may be employed within system 100 within the scope of the present disclosure. Each may comprise a single device or multiple devices cooperating in a distributed environment. For instance, remote settings service 106 may be provided via multiple devices arranged in a distributed environment that collectively provide the functionality described herein. As a specific example, remote settings service 106 can include a database management system based on the Erlang programming language, such as an Mnesia distributed DataBase Management System (DBMS). Any of the various data described herein can be stored and maintained in the database management system. Additionally, other components not shown may also be included within the distributed environment.

Managed devices 102a and 102b through 102n and administrator devices 104a through 102n can also be referred to as client-side devices. Remote settings service 106 may be on the server-side of system 100, while the client-side devices are on the client-side of system 100. A client-side device might take on a variety of forms, such as a personal computer (PC), a laptop computer, a mobile phone, a smartphone, a smartwatch, a tablet computer, a wearable computer, a personal digital assistant (PDA), a server, an MP3 player, a global positioning system (GPS) device, a video player, a handheld communications device, a workstation, any combination of these delineated devices, or any other suitable device.

Application distribution system 112 provides features for managing applications that typically include discovering, downloading, and updating the applications. Examples of application distribution system 112 include application marketplaces, such as Apple® App Store℠, Apple® Mac App Store℠, Google Play™ store, Windows Phone® Store, and Microsoft's Apps for Windows®. As another example, application distribution system 112 could be a beta testing system, such as TestFlight®. Developers can utilize application distribution system 112 to distribute applications to managed devices 102a and 102b through 102n. The applications can correspond to applications 110a, 110b, and/or other applications on the managed devices.

The feature set of application distribution system 112 can be limited and typically does not extend beyond basic application distribution. Furthermore, feature sets can vary between application distribution system 112 and other application distribution systems, which can introduce the risk of fragmenting a developer's user base or complicating application design, particularly in the cross-platform environment. For example, while managed device 102a could be an iPhone having access to Apple App Store, managed device 102b could be an Android device, which does not typically have access to Apple App Store. As such, developers may seek other application management solutions, such as remote settings service 106 to overcome any of the various limitations of application marketplaces and other application distribution systems.

Furthermore, even where application distribution system 112 is not employed by a developer, application management solutions, such as remote settings service 106, can be highly beneficial to developers by providing feature sets that free up development time for core functionality of the applications.

Remote settings service 106 may be employed by a developer or another party to assist in managing one or more of the developer's applications. In particular, remote settings service 106 can be utilized to manage remote settings for one or more applications, such as applications 110a and 110b. The developer and/or another party can manage the remote settings by utilizing any of administrator devices 104a through 104n, or another administrator device, to act as an administrator of the remote settings for one or more applications. While administrator devices 104a through 104n are depicted distinctly from managed devices 102a and 102b through 102n, in some implementations, a managed device can be utilized as an administrator device.

Administrators can utilize administrator devices to manage remote settings for applications on managed devices through remote settings service 106. While administrator devices 104a through 104n are depicted as client-side devices, any of those administrator devices or components thereof could be incorporated into the remote settings service.

Although many approaches to interfacing with remote settings service 106 are within the scope of the present disclosure, in the example shown in FIG. 1, a developer can easily include remote settings features in an application by incorporating one or more libraries, such as library 120 into the application. As shown, application 110a includes library 120, which can correspond to (e.g. be from) a software development kit (SDK). Library 120 includes various functions and routines for interfacing with remote settings service 106, as well as for applying settings to applications that incorporate the library. Although not shown, application 110b could also include library 120. Furthermore, different versions of library 120 may be included in any of the various managed devices in system 100.

As mentioned above, remote settings for applications that are stored on a managed device can be referred as localized remote settings. Localized remote settings are distinguished from applied remote settings in that not all of the localized remote settings are necessarily applied to an application. Each managed device, such as managed devices 102a and 102b through 102n can include one or more sets of localized remote settings. In the present example, application 110a is shown as having localized remote settings 118a on managed device 102a, localized remote settings 118b on managed device 102b, and localized remote settings 108n on managed device 102n. Each instance of application 110a can have the same set and/or sets of localized remote settings or one to all of the set or sets can be different with respect to different application instances. Sets of localized remote settings can be provided to the managed devices by remote settings service 106.

In some aspects of the present disclosure, by providing localized remote settings for applications to the managed devices, a developer can configure settings for applications outside of application distribution system 112 or other application distribution systems. Thus, settings for an application can be modified without necessarily requiring the distribution of a modified version of the application. In some cases, applications are distributed by application distribution system 112 or other application distribution systems with default settings. The default settings can be changed by providing localized remote settings to managed devices utilizing remote settings service 106. However, applications could also be distributed without default settings and can later be provided with settings from localized remote settings via remote settings service 106.

Remote settings service 106 can be utilized to manage a variety of settings for applications on managed devices. A setting can include one or more values that modify the behavior of one or more applications. For example, a setting may enable or disable the display of advertisements in an application, logging in an application, and/or one or more paid features in an application. One or more routines and/or function may correspond to a paid feature. Whether or not a paid feature should be activated may be identified based on an attribute, such as any of attributes 116a. A paid feature may be activated for a period of time, such that a setting may be deactivating after expiration of a subscription or time period. Information that determines whether or not the paid feature should be activated or deactivated by a setting could be tracked and/or stored in remote settings service 106. Another setting may change the background color of a home screen of an application. A setting can have a format such that the application can identify a manner in which to apply the setting. As an example, the setting could include one or more key-value pairs. An application can have preexisting code that can identify how to apply the value to the application based on a corresponding key. A setting may also be referred to as a configuration instruction, which can be defined by one or more key-value pairs. Values can correspond to configurations for an application, and the application can have routines and/or functions that determine how to apply those values to the application based on identifying one or more keys in the setting. For example, the application may be programmed to recognize the one or more keys and apply values of the keys using one or more routines and/or functions that correspond to or are otherwise associated with the keys.

In some instances, a setting can enable or disable a routine of one or more applications. A routine can comprise one or more functions of an application. An application can be distributed to a managed device with a plurality of routines. For example, each instance of application 110a includes routines 114 in FIG. 1 and library 120 also includes one or more routines. Application 110b can be distributed with a different group of routines than application 110a. Also, in some instances routines may be added to an application after distribution thereof, for example, by remote settings service 106, and could be a part of localized remote settings 118a, 118b, or 118c. By enabling or disabling any combination of the routines of an application, certain features of the application can be toggled on or off after distribution of the application.

A specific example of a routine is a logging routine. A logging routine can correspond to a routine that includes one or more functions that log information on a managed device. For example, routines 114 could comprise one or more logging routines that can log information generated by executing application 110a, or otherwise available on a managed device. By enabling a logging routine, a developer can be provided with one or more logs of the logged information, for example, for debugging an application on a managed device. The logging routine could later be disabled, for example, when the developer has finished debugging the application, or where logging is otherwise no longer desired.

In addition to or instead of enabling or disabling any of various routines on the managed devices, remote settings service 106 can be utilized to configure any of the various routines. A setting that configures a routine can be any setting that modifies operation of the routine. In some cases, multiple settings may modify operation of the same routine. In some implementations, a setting can modify operation of a routine by providing one or more variables to one or more functions of the routine. In addition, or instead, a setting can modify operation of a routine by enabling or disabling any of the various functions that make up the routine.

As a specific example, where a routine is a logging routine, a variable could be provided by a setting that selects a logging level of the logging. The variable could be a value that corresponds to the logging level. Higher logging levels may cause functions of the routine to log additional information relative to lower logging levels. As another example, one or more variables could select any combination of various logging functions of a logging routine. Each of the logging functions may log different information on a managed device. As another example, a setting could configure a user interface routine by enabling or disabling a function that presents a button on a user interface of an application. When the button is enabled, a user of a managed device may toggle the button to selectively enable or disable a logging routine or other routine on the managed device.

Application distribution system 112 and other application distribution systems typically distribute applications to managed devices such that instances of the same application deployed on different managed devices have the same settings. In some implementations, by utilizing remote settings service 106, instances of the same application on different managed devices can optionally be provided with different settings. For example, the instance of application 110a on managed device 102a can have at least one different set of localized remote settings than the instance of application 110a on managed device 102b.

The foregoing can be accomplished by taking into account any of various attributes of applications, managed devices that include the applications, and/or users of the managed devices or applications. For example, FIG. 1 indicates that managed device 102a has attributes 116a, managed device 102b has attributes 116b, and managed device 102n has attributes 116n. An example of an attribute of a managed device is a platform of the managed device. Platforms of managed devices 102a, 102b, and 102n can be any combination of Android™, iOS®, and Windows Phone®, as some examples. Another example is a model of a managed device, such as Nexus 5, iPhone 5, and Samsung GT-I9300. Other examples include a carrier (e.g. T-mobile®, AT&T®, Sprint®), a connection type (e.g. WiFi, UMTS, LTE), an operating system version (e.g., 4.3, 4.4.2, 7.1), an IP address, a location (e.g. United States, China, Japan, Germany), a battery level, a storage capacity level, a capability, a device identifier, a serial number, a machine address code (MAC) address, and many more.

Examples of attributes of applications include an application version (e.g. version number and/or version name), an install date, a runtime, a language, an application identifier, an SDK version, a binary name, and many more. Certain attributes may be of a user of an application and/or a managed device. A user can have an associated user profile that comprises various attributes. Attributes for a user can include a user identifier, such as a universally unique identifier (UUID), an age, a gender, a payment status or history, a user account status, and many more.

Attributes can be defined by one or more values and may have predefined schemas, such that values of attributes are consistent amongst managed devices having remote settings being implemented utilizing remote settings service 106. Some schemas could be carried out by library 120 and others could be carried out by routines 114, as an example. In some instances, at least some remote settings can be applied to an instance of an application on a managed device based on any of the various attributes or combination of attributes. For example, one setting or groups of settings may be applied to or not applied to a managed device based on the managed device corresponding to one or more designated attributes. Thus, for example, managed device 102a may have one setting applied to its instance of application 110b, whereas managed device 102b does not have the same setting applied to its instance of application 110b based on one or more attributes. In this way, settings can be made specific to one or more groups of or one or more specific ones of managed devices or users for the same application.

In some implementations, remote settings service 106 provides remote settings to a managed device at which the settings are stored as localized remote settings. The remote settings provided by remote settings service 106 can include assignments between attributes and at least some settings therein. The assignments can define target devices of the at least some settings. A target device for a setting can correspond to a device that is intended to implement the setting. By providing one or more indications of one or more attributes being assigned to one or more settings to a managed device, the managed device can determine whether or not to apply any of the various settings that may be provided by remote settings service 106. In other words, the managed device can determine whether or not it is a target device. In some cases, a managed device may be in a better position for this determination than remote settings service 106, as many attributes can be determined quickly and accurately at the managed device.

Thus, remote settings service 106 does not necessarily need to store and maintain comprehensive indexes of attribute information for the managed devices. Furthermore, one to all of the same localized remote settings can be provided to different managed devices, while still allowing for different settings to be applied to the managed devices. This can allow for remote settings service 106 to quickly respond to network communications from the managed devices with remote settings, as remote settings service 106 can assign attributes to at least some settings of remote settings that are eventually sent to the managed devices prior to receiving the network communications and without having to query the managed devices for attribute information.

While in various implementations, one or all of the same localized remote settings are provided to different managed devices, for example, to different instances of the same application on the managed devices, at least some of the localized remote settings that are provided could be different from one another. For example, remote settings service 106 could provide different settings to the managed devices based on any of the various attributes described herein. The attributes that correspond to a managed device can be communicated to remote settings service 106 by the managed device and optionally can be stored and maintained by remote settings service 106. This approach may be especially suitable for attributes that do not typically change or frequently change over time, such as for the lifetime of the managed device. Some specific examples include a model of the managed device and a platform of the managed device, and various attributes that are descriptive of hardware components of the managed device.

Remote settings service 106 can be employed for receiving, providing, updating, and/or modifying at least one localized remote setting for at least one application on a managed device at any time. Furthermore, the managed device may apply any of the various localized settings at any time. Thus, changes to sets of localized remote settings may or may not cause immediate changes to corresponding applied remote settings. While at least some localized remote settings could be applied to an application proximate to and in response to receipt of localized settings, others could be applied regardless of when localized settings are received.

In some implementations, remote settings service 106 can provide remote settings to a managed device responsive to a request from the managed device. A request from a managed device can be made at any time and can be made by an application, such as application 110a, which may employ library 120 to make the request. Requests can follow any of a variety of protocols. In some instances, requests and responses to requests are made in accordance with HyperText Transfer Protocol (HTTP). For example, a request can be an HTTP POST request. As such, the request could comprise a uniform resource locator (URL) that includes header and payload data.

In some instances, a request is made based on the application being active on a managed device, as opposed to being suspended or otherwise inactive. Also, a request can be made as part of a routine, such as routines 114 and/or routines of library 120. In some aspects of the present disclosure, a request is part of a startup routine of an application, which could be from library 120 and/or routines 114. A startup routine can generally be a routine that executes based upon an application becoming active, such as based on being launched or returning from suspension or other levels of reduced activity. In some cases, a startup routine executes unconditionally upon the application launching. In other cases, a startup routine may execute based on being launched for the first time after an install of the application. In some cases, the request is sent or transmitted each time the application starts up, or launches. By being incorporated into a startup routine of an application, a request can be made at a time when the application is active and will likely remain receptive to receiving and/or implementing remote settings from remote settings service 106. Therefore, resources of remote settings service 106 can be preserved by increasing the likelihood that any responses to the request are successful. Furthermore, a user of the application would likely be more tolerant of any possible delay or other impact in application performance during startup, as many users are accustomed to applications loading at startup.

In addition, or instead, in some instances, remote settings service 106 can provide remote settings to the managed device without necessarily first receiving a request from the managed device. For example, one or more remote settings may be provided to a managed device based on receiving a modification to reference remote settings from an administrator, which may be provided from an administrator device. As another example, the administrator may prompt remote settings service to provide one or more remote settings to one or more managed devices. These and other features of remote settings service 106 are described in additional detail with respect to FIG. 2.

Figure 2:
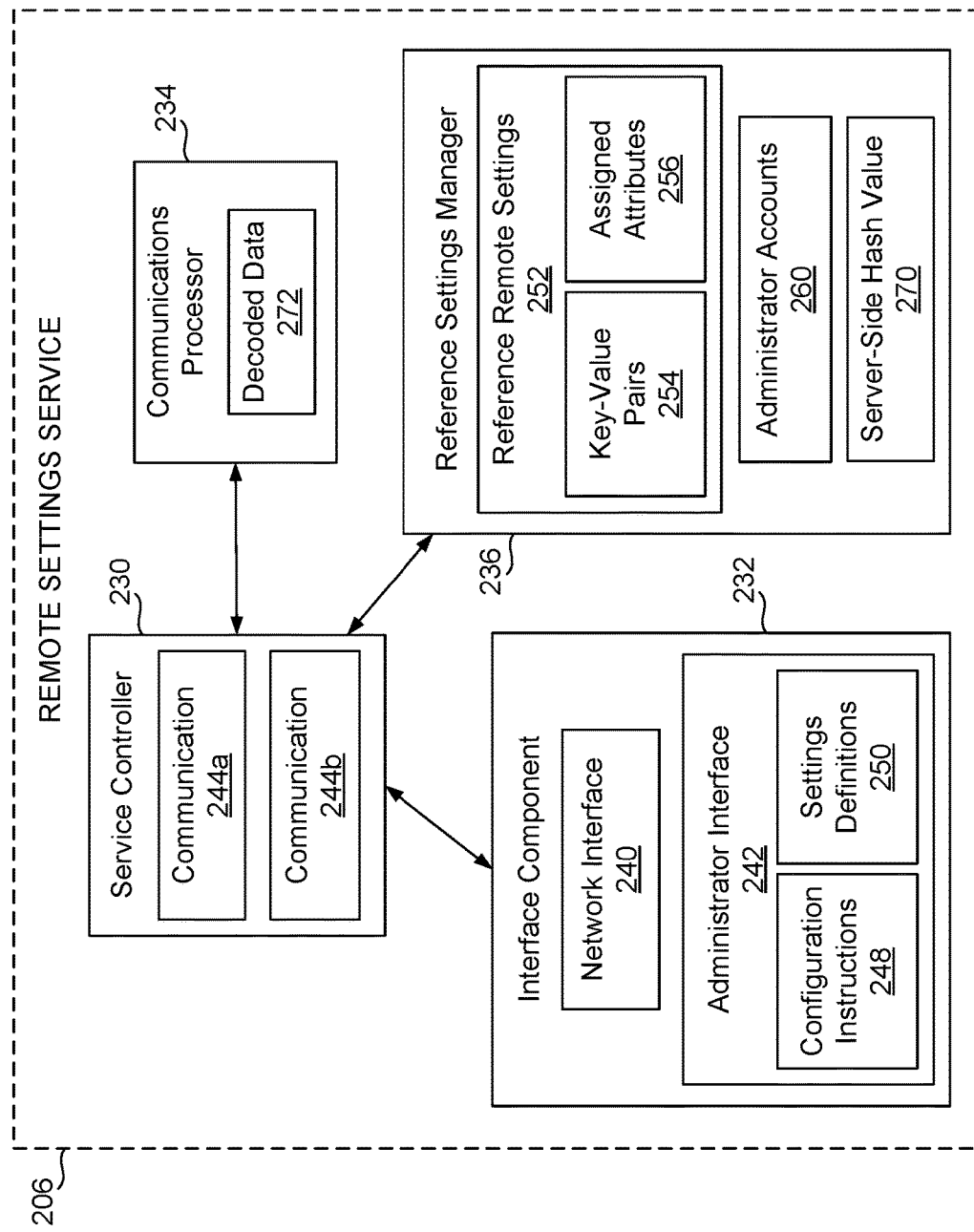
FIG. 2 illustrates an exemplary remote settings service in accordance with implementations of the present disclosure.

Referring to FIG. 1 with FIG. 2, FIG. 2 shows remote settings service 206, which can correspond to remote settings service 106 in FIG. 1. Remote settings service 206 includes service controller 230, interface component 232, communications processor 234, and reference settings manager 236. Service controller 230 is configured to direct operations for management of remote settings for remote settings service 206, which can include routing information between any of the various aforementioned constituents of remote settings service 206. In doing so, settings can be remotely managed for applications on managed devices by way of an interface component of remote settings service 106.

Interface component 232 includes network interface 240 and administrator interface 242. Network interface 240 is configured to receive incoming network communications for remote settings service 206, such as communication 244a provided to service controller 230. Network interface 240 is also configured to send outgoing communications, such as network communication 244b from service controller 230. The incoming and outgoing communications can be from managed devices or administrator devices. Furthermore, service controller 230 can direct interface component 232 in communicating with the managed devices and/or the administrator devices so as to manage remote settings on any combination of the managed device by way of the incoming and outgoing network communications, such as communications 244a and 224b, respectively.

With respect to administrator devices, network interface 240 can cooperate with administrator interface 242 in allowing for administrators to interact with remote settings service 206 for management of remote settings for applications on managed devices. In some aspects of the present disclosure, an administrator can utilize administrator interface 242 to provide reference remote settings, such as reference remote settings 252 to remote settings service 206. As described previously, reference remote settings can correspond to settings for applications that are intended to be provided to one or more managed devices for the applications (e.g. as designated by one or more administrators). However, reference remote settings are not necessarily on the one or more managed devices at any given time. For example, reference remote settings can change after being provided to the one or more managed devices, and therefore, any changes may later be provided to the one or more managed devices.

In this regard, the administrator can provide any combination of configuration instructions 248 (e.g. values for settings) and settings definitions 250 (e.g. keys for settings) as inputs to remote settings service 206 via administrator interface 242. The foregoing information may be provided by an administrator, for example, by way of a web browser or other application on an administrator device that is capable of communicating with administrator interface 242. The web browser or other application can present information to the administrator that is being maintained by remote settings service 206 in order to aid the administrator in generating configuration instructions 248 and settings definitions 250. For example, one or more current settings of the reference settings could be presented with options or other means to modify the settings.

Service controller 230 can provide reference settings manager 236 with configuration instructions 248 and/or settings definitions 250 that are received from administrator interface 242. Reference settings manager 236 can manage remote settings, such as reference remote settings 252 based on the received configuration instructions 248 and/or settings definitions 250. Settings definitions 250 comprises information that defines one or more settings for reference remote settings 252 and may optionally replace one to all of reference remote settings 252. In some implementations, each settings definition includes at least one key for a key-value pair. The one or more settings that are defined may have one or more default attributes, values, and/or configurations provided by the administrator.

While in some implementations, remote settings service 206 can optionally receive settings definitions from an administrator, in some cases, at least some settings are provided or defined by remote settings service 206. For example, remote settings service 206 may have one or more default settings definitions or presets that could be available to any of the various applications that have remote settings being managed using remote settings service 206. One specific example could be one or more settings definitions that correspond to one or more logging routines of the applications. In various implementations, the default or presets that are available for reference remote settings correspond to one or more routines of library 120 (e.g. routines that are provided by an SDK).

Configuration instructions 248 can correspond to instructions that configure settings of reference remote settings, such as reference remote settings 252. In some implementations, a setting comprises a key-value pair and optionally one or more assigned attributes. For example, as shown, reference remote settings 252 comprise key-value pairs 254 and assigned attributes 256. Settings can be configured, for example, by configuring the values and/or assigned attributes of the settings. In some cases, configuration instructions provide one or more values and/or assigned attributes for one or more settings thereby used to configure the one or more settings.

An administrator can have an administrator account, or profile, which can be included in administrator accounts 260, shown in FIG. 2. In some implementations, reference settings manager 236 can utilize administrator accounts 260 in managing reference remote settings. An administrator account can define privileges, or rights, of an administrator with respect to one or more applications, one or more remote settings, and/or one or more sets of remote settings. Reference settings manager 236 can enforce those privileges, or rights, with respect an administrator's ability to view, modify, update, delete, add to, or otherwise alter reference remote settings (e.g. provide new values of one or more settings), members of one or more sets of remote settings, which reference remote settings and/or sets of reference remote settings are to be provided to an application and/or a managed device (e.g. provide new attribute assignments for settings), and many more remote management abilities of administrators, including those described herein.

Privileges can correspond to any of a variety of potential management abilities and different administrators may have at least some privileges in common. Privileges may be assigned to administrators at the application level. For example, one or more administrators may be assigned a privilege to manage settings for application 110a, whereas one or more other administrators are not assigned a privilege to manage settings for application 110a, but are assigned a privilege to manage settings for at least application 110b.

Privileges could also be assigned to administrators at the settings level with respect to an application. For example, although multiple administrators have at least some management privileges with respect to application 110a, only some of those administrators may be permitted to view, delete, change, or otherwise manage one or more designated settings and/or designated sets of settings for application 110a, while others of those administrators may have management rights with respect to one or more other settings.

Additionally, privileges for managing settings for an application can further be assigned at the ability level with respect to management of settings. As an example, one administrator may have privileges to view, or read from, one setting, but not alter, or write to, that setting. Another administrator might be able to both read from, and write to, the setting.

By implementing administrator accounts and privileges, reference settings manager 236 can effectively provide remote management services for multiple developers or other parties, who each may have one or more associated applications. Thus, in FIG. 2, an administrator account of a developer can have privileges with respect to reference remote settings 252, by way of example. The same administrator account can have privileges with respect to multiple sets of reference remote settings. The sets of reference remote settings can be for various applications that are associated with the administrator account and may be owned by the developer. For example, in FIG. 1, one set of reference remote settings may be for application 110a, and another set of reference remote settings may be for application 110b.

In remotely managing settings, reference settings manager 236 can determine whether or not to send reference remote settings to a managed device. Reference remote settings can correspond to settings for applications that are intended to be provided to one or more managed devices for the applications (e.g. as designated by one or more administrators). At least some reference remote settings can be sent to a managed device responsive to a request from the managed device, as described earlier, or can be sent to the managed device independent of having received a request. A request can correspond to a network communication sent by the managed device to remote settings service 206. Reference settings manager 236 may employ a server-side hash value, such as server-side hash value 270, to determine whether or not to respond to the request with reference remote settings, as described in further with respect to FIG. 3.

Figure 3:
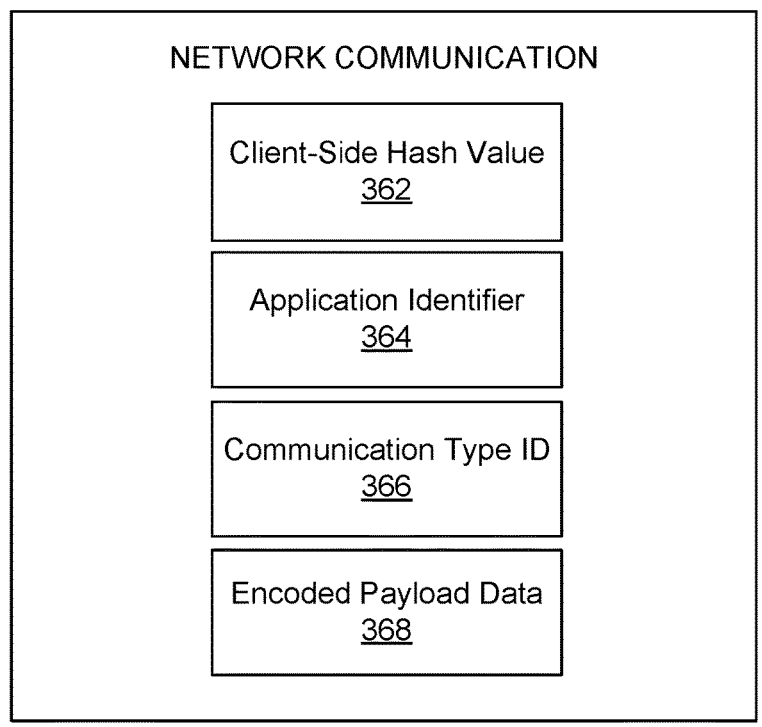
FIG. 3 depicts an exemplary network communication in accordance with implementations of the present disclosure.

FIG. 3 depicts exemplary network communication 344 that can correspond to a request sent by a managed device, in accordance with some implementations of the present disclosure. For exemplary purposes, the managed device will be described with respect to managed device 102a in FIG. 1, however, other managed devices can send similar requests. Network communication 344 can correspond to network communication 244a in FIG. 2.

As indicated by FIG. 3, a network communication can comprise a client-side hash value, such as client-side hash value 362, which can correspond to any of client-side hash values 162a, 162b, and 162n in FIG. 1. A client-side hash value can correspond to one or more remote settings on the managed device sending the request, such as localized remote settings that are associated with an application. For example, client-side hash value 162a may correspond to remote settings that are utilized in applying settings to application 110a on managed device 102a, which may be the most recently received reference remote settings from remote settings service 206 for application 110a (e.g. localized remote settings 118a) with respect to managed device 102a.

In some implementations, the managed device sending the request generates the client-side hash value from the one or more remote settings. For example, managed device 102a can hash localized remote settings 118a to generate client-side hash value 162a. In other implementations, the managed device does not generate the client-side hash value, and may have previously received the client-side hash value from a network communication from remote settings service 206 (optionally in a response to network communication 344). For example, managed device 102a may have previously received client-side hash value 162a from remote settings manager 236. Furthermore, client-side hash value 162a may have been received along with and/or in association with any reference remote settings that were hashed to generate client-side hash value 162a (e.g. hashed by remote settings service 206).

Client-side hash values can be generated utilizing any suitable hash algorithm. An example of a suitable hash algorithm is an MD5 or message-digest hash algorithm or a secure hash algorithm (SHA). Furthermore, client-side hash values can be generated at any suitable time. Where a managed device generates client-side hash values, generation can occur responsive to receipt of reference remote settings from remote settings service 206. Thus, for example, managed device 102a can generate client-side hash value 162a responsive to receiving the reference remote settings that correspond to localized remote settings 118a. In addition, or instead, managed device 102a may generate client-side hash value 162a as part of a startup routine. In cases where managed device 102a does not include localized remote settings, such as on initial launch after install, client-side hash value 162a may be given a default value or may be generated from default localized remote settings.

Remote settings service 206 can receive the request (e.g. network communication 344) from the managed device. Remote settings service 206 can also generate server-side hash values, such as server-side hash value 270 based on any to all of reference remote settings, such as reference remote settings 252, which are associated with an application. Server-side hash values can be generated at any suitable time. It is noted that in some cases, the server-side hash value may be generated by an administrator device or otherwise be generated outside of remote settings service 206.

In some implementations, a server-side hash value is generated prior to receipt of a network communication of the request. For example, server-side hash value 270 can be generated and/or updated in response to any modifications made to reference remote settings that are hashed to generate server-side hash value 270, for example to replace a previous version of the server-side hash value with a new server-side hash value. In doing so, the server-side hash value will typically be available upon receipt of a corresponding network communication, such as network communication 344. This can aid in rapidly providing any response that may be made to the request.

A server-side hash value is generally hashed utilizing the same hashing algorithm as a corresponding client-side hash value, such as the MD5 hash algorithm or the SHA. Thus, the two hash values should match if one or more settings (e.g. localized remote settings 118) hashed to generate client-side hash value 362 match one or more reference remote settings (e.g. reference remote settings 252) hashed to generate the server-side hash value. The hash values can be compared to one another by reference settings manager 236 to determine whether or not there is a match. A match can indicate that the managed device that sent the request has the most current reference remote settings that are intended for an application and/or the managed device. Based on a match, remote settings service 206 may refrain from responding to the request. In other implementations, remote settings service 206 may respond using an outgoing communication, such as network communication 244b, but may refrain from sending any reference remote settings to the managed device in the response based on the match.

A mismatch indicated by the comparison can convey that the managed device that sent the request does not have the most current reference remote settings. This can occur, for example, where the managed device lacks any localized remote settings, such as upon initial launch of an application after install. As another example, while localized remote settings that are hashed to form the client-side hash value may have initially been identical to the reference remote settings that correspond to the localized remote settings, changes could have subsequently been made to the reference remote settings, for example, by an administrator. As such, the client-side hash value may not match the server-side hash value, indicating that the localized remote settings are out of date or otherwise in need of modification. Thus, remote settings service 206 can send the reference remote settings to the managed device based on the comparison between the server-side hash value and the received client-side hash value to update the localized remote settings on the managed device. More particularly, the sending may be based on the comparison indicating a mismatch between the server-side hash value and the client-side hash value. However, it is noted that the sending may still be performed despite a match between the server-side hash value and the client-side hash value, or based on the match. For example, an administrator may override the sending based on the mismatch.

As many different reference remote settings may be available to reference settings manager 236, information may be provided to reference settings manager 236, such that the service-side hash value that is utilized in the comparison corresponds to the proper reference remote settings for the managed device that sent the request. In some cases, at least some of this information may be provided by the managed device, such as in the network communication that corresponds to the request. Reference remote settings and/or server-side hash values hashed from those reference remote settings can be indexed by or otherwise associated with any of this information. Thus, for example, server-side hash value 270 can be retrieved or generated for a comparison with client-side hash value 362 by accessing an index entry corresponding to application 110a or otherwise retrieving application 110a based on the information.

In some cases, the information could comprise an application identifier, such as application identifier 364, such that the server-side hash value is utilized in the comparison based on the application identifier (e.g., the settings that correspond to the server-side hash value can be identified using the application identifier). As such, the aforementioned indexing could be by application identifiers. An application identifier can correspond to an identifier that can be utilized to identify an application amongst a plurality of applications. In some instances, the information can comprise other attributes utilized to select the server-side hash value in addition to or instead of an application identifier. Such attributes can correspond to any of the various attributes described with respect to attributes 116a, 116b, and 116n.

By selecting server-side hash values for comparison based on one or more attributes, different reference remote settings can be compared to and/or subsequently provided to managed devices based on those attributes. Thus, for example, utilizing an application identifier, a comparison could utilize a server-side hash value based on an application that is identified from a network communication based on the application identifier. Thus, for example, a user identifier (ID) could be associated with reference remote settings, such that an administrator can individually designate the reference remote settings for that user ID (e.g. a UUID). This aspect of the present disclosure can be useful for debugging applications. Furthermore, by associating reference settings with additional attributes or more generic attributes than a unique identifier, groups of managed devices can be targeted by the administrator for the reference remote settings. Amongst many potential uses, this feature can be used for A/B testing an application amongst various managed devices.

As indicated above, at least some of the attributes may have been previously provided to remote settings service 206 by managed devices, or by another source, such as by administrators. Remote settings service 206 can manage and maintain such information, which may be stored in association with corresponding managed devices. For example, any of attributes 116a of managed device 102a can be stored in association with managed device 102a and any of attributes 116b of managed device 102b can be stored in association with managed device 102b. In addition, or instead, any of the various attributes may be included in the network communication corresponding to a request by a managed device.

By including one to all of any attributes or other information that is utilized to select or generate the server-side hash value 270 in the network communication from the managed device, the attributes can be made more readily available and are more likely to be up to date, as compared to attributes maintained by remote settings service 206. As examples, an application version identifier could be included and different reference remote settings can be associated with different versions of the same application. Another example is an administrator ID, however, the application identifier could also be associated with an administrator in remote settings service 206.

As indicated by FIG. 3, a managed device (e.g. managed device 102a) can determine which communication type ID to include in a network communication and include that communication type ID in the network communication. For example, the managed device may select communication type ID 366 to include in network communication 344. A communication type ID can identify the type of network communication or request that the managed device is providing to remote settings service 206. In the example shown, communication type ID 366 identifies network communication 344 as a remote settings type communication. Communications processor 234 can extract the communication type ID from a network communication and can process the remainder of the network communication in accordance with processing instructions that are associated with the communication type ID. Furthermore, different values of the communication ID could indicate which attributes are included in the network communication and/or different variations of remote settings type communications.

A network communication of a request can further comprise encoded payload data, such as encoded payload data 368. Encoded payload data can generally correspond to data that is in an encoded format. The encoded payload data can be decoded in communications processor 234 processing the network communication. The decoded data can comprise a variety of information, which is not necessarily, but may be employed for remotely managing settings of managed devices. In some cases, the encoded payload data includes any of various attributes, such as attributes 116a, which can be stored in association with managed device 102a for management of remote settings on that device. Other examples include logged information from the managed device, which could be from a logging routine, as described above. Thus, encoded payload data 368 could include one or more debug logs. Encoded payload data 368 could also include one or more crash logs, clickstream logs, or other types of event based logs.

In some variations, communications processor 234 completes processing of the network communication corresponding to the request after the sending of at least some reference remote settings to the managed device in a response to the request. In doing so, remote settings service 206 can more rapidly respond to the managed device that sent the request, allowing for more unobtrusive and transparent management of remote settings on the managed device.

In some instances, communications processor 234 completes decoding of encoded payload data (such as encoded payload data 368) after the sending of at least some reference remote settings to the requesting managed device. Doing so can save significant processing time that would otherwise delay the sending. For example, the encoded payload data could comprise kilobytes or more of data and take seconds to process. The encoded payload data can comprise key-value pairs. In some cases, decoding of the encoded payload data includes parsing and/or otherwise analyzing and processing the key-value pairs. The encoded payload data can correspond to an encoded data object. Examples include a JavaScript Object Notification (JSON) encoded object and an Extensible Markup Language (XML) encoded object.

Figure 4:
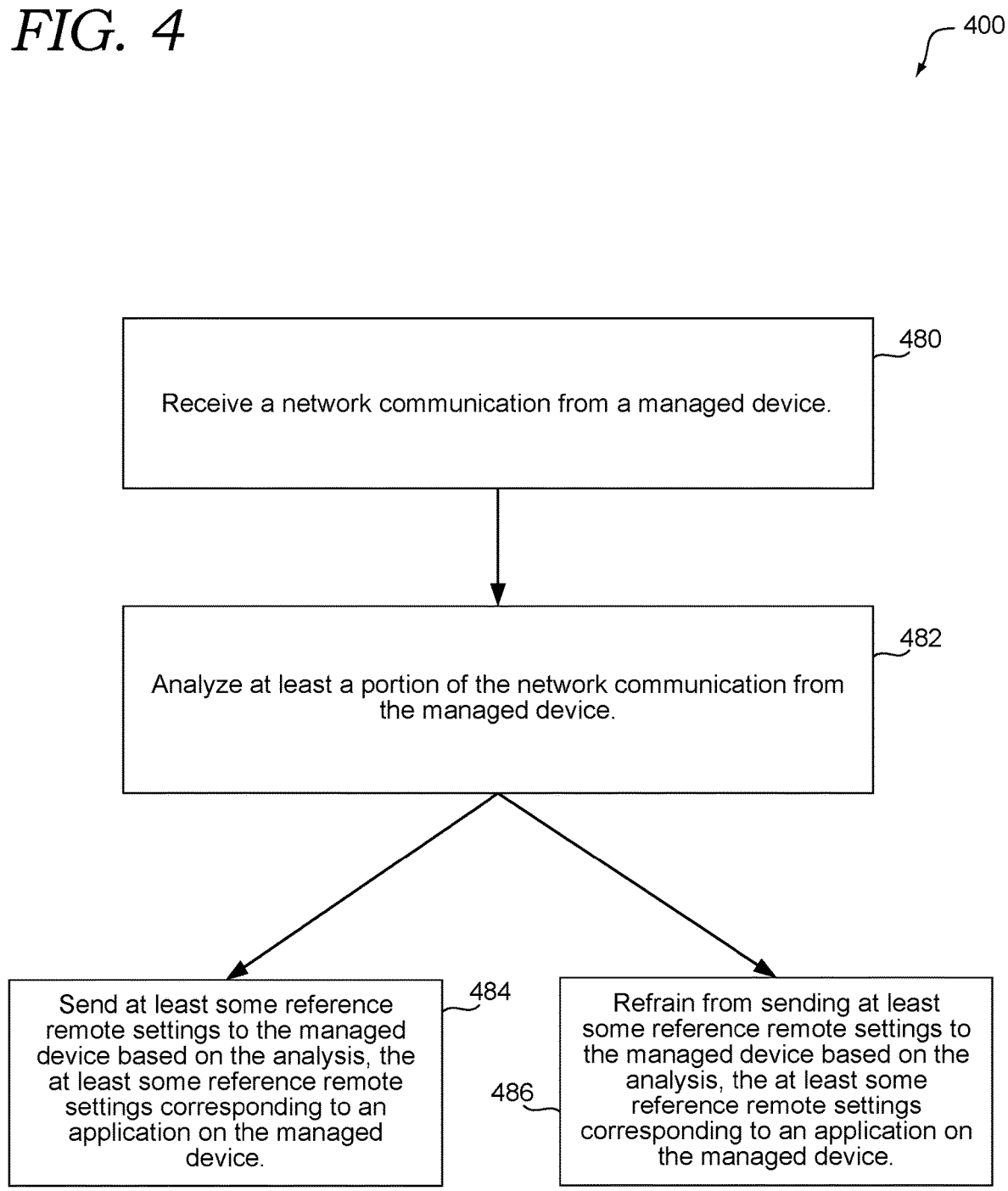
FIG. 4 depicts a flow diagram of an exemplary method remotely managing settings of applications in accordance with implementations of the present disclosure.

An exemplary approach to remotely managing settings of applications is shown in FIG. 4. Referring now to FIG. 4 (in combination with FIGS. 1, 2, and 3), FIG. 4 is a flow diagram showing method 400 for remotely managing settings of applications in accordance with implementations of the present disclosure. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 480, method 400 includes receiving a network communication from a managed device. For example, remote settings service 206 can receive network communication 344 from managed device 102*a*. Network communication 344 may have been sent or transmitted by managed device 102*a* as part of a startup routine from library 120. Network communication 344 can comprise client-side hash value 362, application identifier 364, communication type ID 366, and encoded payload data 368. Managed device 102*a* may have generated client-side hash value 162*a*, corresponding to client-side hash value 362, by hashing localized remote settings 118*a*. In one example, network communication 344 is an HTTP POST request and comprises a URL. The URL includes the client-side hash value 362, application identifier 364, and communication type ID 366 as raw or plain text.

At block 482, method 400 further includes analyzing at least a portion of the network communication from the managed device. For example, remote settings service 206 can analyze at least a portion of network communication 344. In doing so, upon receiving network communication 344, communications processor 234 may extract communication type ID 366. Based on communication type ID 366 indicating a remote settings type communication, communications processor 234 can extract client-side hash value 362 and application identifier 364 from network communication 344. Reference settings manager 236 can identify network communication 344 as corresponding to application 110*a* based on application identifier 364 by retrieving server-side hash value 270 from an index of server-side hash values that is indexed by corresponding application identifiers. The index may be stored in memory for rapid retrieval of server-side hash value 270.

Server-side hash value may have been generated by remote settings service 206 by hashing reference remote settings 252. Reference remote settings 252 correspond to application 110*a*, for example, based upon being assigned to application identifier 364 by an administrator. Reference settings manager 236 can compare client-side hash value 362 with server-side hash value 270.

Blocks 484 and 486 represent different options that may be performed, for example, depending on the results of the comparison performed at block 482. Block 484 may be performed based on or in response to the comparison performed at block 482 indicating a mismatch between server-side hash value 270 and client-side hash value 362, such that localized remote settings 118*a* on managed device 102*a* should be updated to reference remote settings 252. Block 486 may be performed based on or in response to the comparison performed at block 482 indicating a match between server-side hash value 270 and client-side hash value 362, such that localized remote settings 118*a* on managed device 102*a* do not need to be updated to reference remote settings 252.

At block 484, method 400 includes sending at least some reference remote settings to the managed device, the at least some reference remote settings corresponding to an application on the managed device. For example, network interface 240 of remote settings service 206 can send reference remote settings 252 to managed device 102*a*, corresponding to application 110*a* on managed device 102*a* via network communication 244*b*.

After sending network communication 244*b* to managed device 102*a*, communications processor 234 can complete processing of network communication 344. For example, communications processor 234 can complete decoding of encoded payload data 368 into decoded data 272. Decoded data 272 can comprise attributes of managed device 102*a* and the attributes can be stored and maintained by remote settings service 206 in association with application 110*a*, managed device 102*a*, and/or an administrator. In some implementations, the attributes are optionally utilized target managed devices for application settings. In these cases, the attributes may optionally be decoded prior to sending network communication 244*b* to managed device 102*a*, or older versions of the attributes could be employed.

At block 486, method 400 includes refraining from sending at least some reference remote settings to the managed device, the at least some reference remote settings corresponding to an application on the managed device. For example, remote settings service 206 can refrain from sending reference remote settings 252 to managed device 102*a*, corresponding to application 110*a* on managed device 102*a*. However, reference setting service 206 may still send network communication 244*b* to managed device 102*a*, but without reference remote settings 252. For example, network communication 244*b* could be a communication to close a connection to managed device 102*a*.

Figure 5:
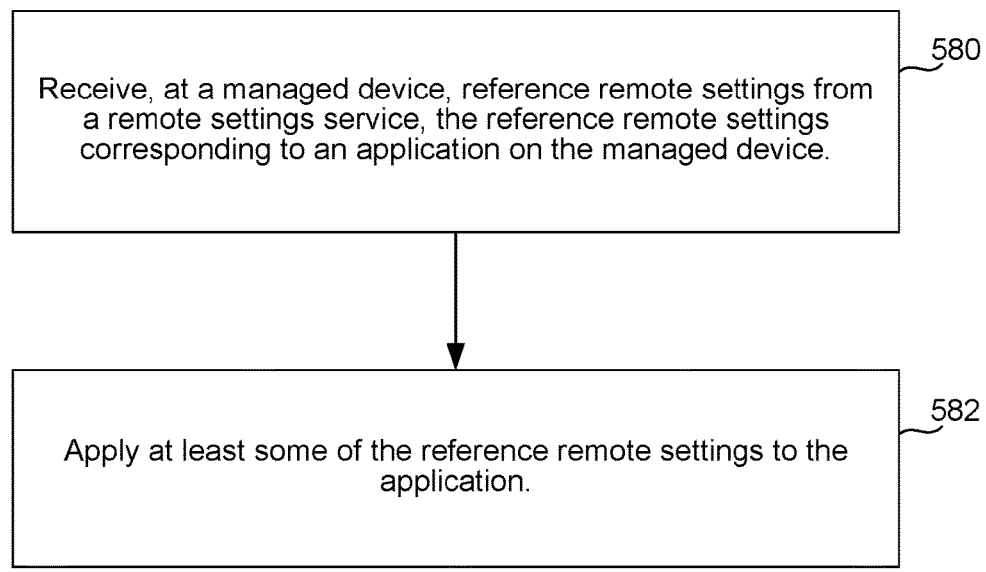
FIG. 5 depicts a flow diagram of an exemplary method remotely managing settings of applications in accordance with implementations of the present disclosure.

Another exemplary approach to remotely managing settings of applications is shown in FIG. 5. Referring now to FIG. 5 with FIGS. 1, 2, and 3, FIG. 5 is a flow diagram showing method 500 for remotely managing settings of applications in accordance with implementations of the present disclosure.

At block 580, method 500 includes receiving, at a managed device, reference remote settings from a remote settings service, the reference remote settings corresponding to an application on the managed device. For example, managed device 102a can receive reference remote settings 252 from remote settings service 206. Reference remote settings 252 can be received in network communication 244b, which could optionally be a response to network communication 244a. Network communication 244b can comprise a URL in accordance with HTTP. Reference remote settings 252 in network communication 244b can correspond to an encoded data object, such as a JSON encoded object. Furthermore, reference remote settings 252 can correspond to application 110a, which could optionally be indicated by an application identifier being included in network communication 244a.

At block 582, method 500 includes applying at least some of the reference remote settings to the application. For example, managed device 102a can apply at least some of the reference remote settings to application 110a. After receiving reference remote settings 252, managed device 102a may have stored reference remote settings 252 as localized remote settings 118, and may have applied at least some of reference remote settings 252 to application 110a from localized remote settings 118. Reference remote settings 252 in network communication 244b may have included indications of attributes that are associated with settings of reference remote settings 252. Based on the indications, managed device 102a may apply settings of reference remote settings 252 in cases where attributes 116a satisfy any corresponding attribute requirements of the settings. Furthermore, based on the indications, managed device 102a may refrain from apply settings of reference remote settings 252 in cases where attributes 116a do not satisfy any corresponding attribute requirements of the settings.

Figure 6:
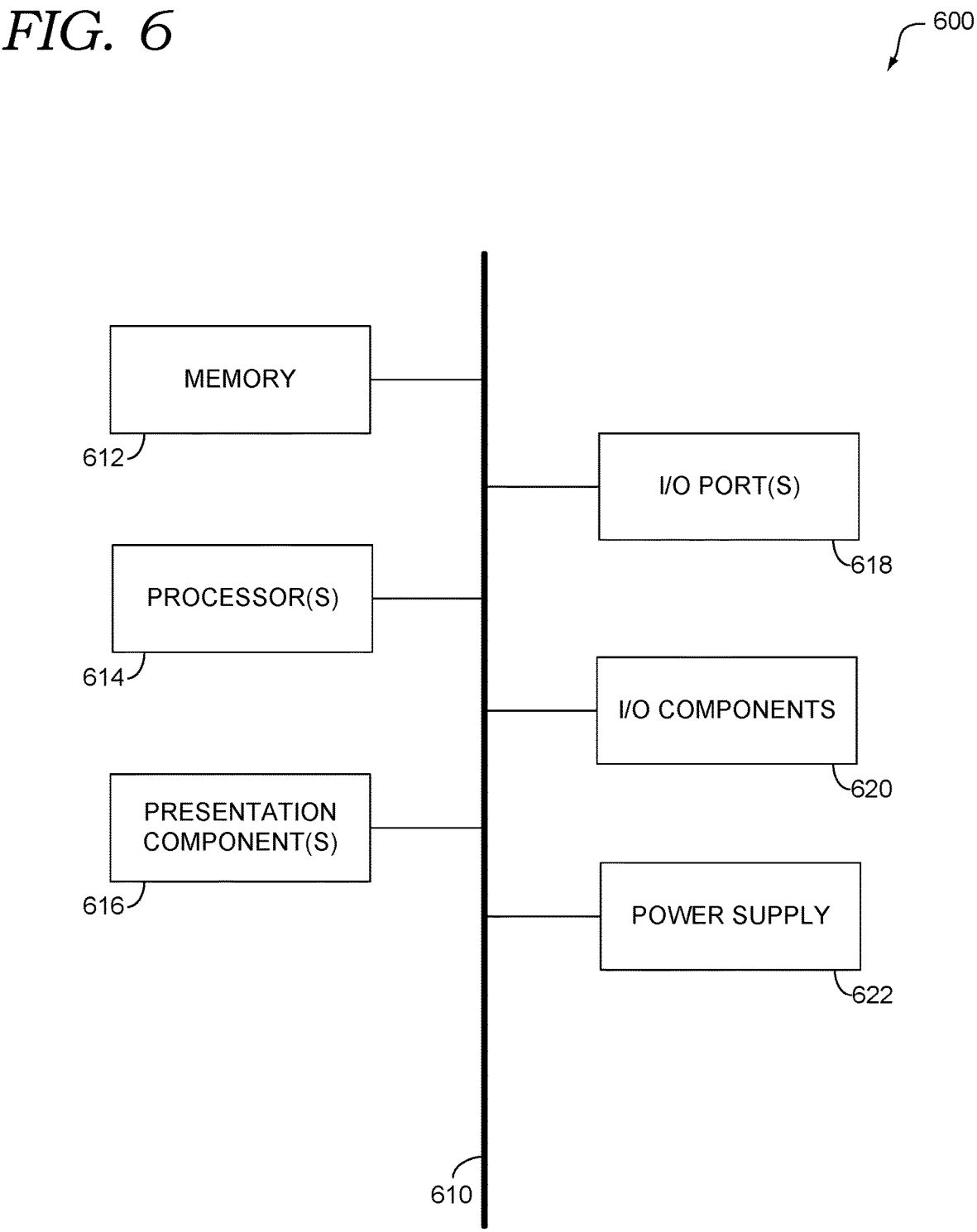
FIG. 6 is a diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

As can be understood, implementations of the present disclosure provide for remote management of application settings. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method for remotely managing settings of applications, the method comprising:
receiving a communication from an application on a managed device, the received communication comprising an application identifier of the application and a client-side hash value of a first set of settings of the application;
identifying a server-side hash value of a second set of settings for the application using the application identifier in response to the receiving of the communication, the second set of settings comprising configuration instructions specific to the application identifier and were modified, prior to receiving the communication, in response to input provided via a device associated with the application to debug the application in association with the second set of settings, wherein the device is separate from the managed device; and
based on a difference of the received client-side hash value and the server-side hash value, transmitting, to the application on the managed device, a key-value pair representing a setting associated with the second set of settings to replace a first setting associated with the first set of settings causing the application to apply the configuration instructions to modify a configuration of the application.

2. The computer-implemented method of claim 1, further comprising generating the server-side hash value prior to the receiving of the communication.

3. The computer-implemented method of claim 1, wherein the configuration instructions comprise a plurality of key-value pairs.

4. The computer-implemented method of claim 1, further comprising completing processing of the received communication after the transmitting of the key-value pair representing the setting associated with the second set of settings.

5. The computer-implemented method of claim 1, further comprising completing decoding of encoded payload data of the received communication after the transmitting of the key-value pair representing the setting associated with the second set of settings.

6. The computer-implemented method of claim 1, further comprising determining to use the server-side hash value in a comparison of the received client-side hash value and the server-side hash value based on the application identifier in the received communication.

7. The computer-implemented method of claim 1, wherein the server-side hash value was generated based on the modification.

8. The computer-implemented method of claim 1, wherein at least some of the configuration instructions correspond to a logging routine of the application.

9. The computer-implemented method of claim 1, wherein one or more settings of the second set of settings comprise attributes that define whether or not the managed device is to apply the one or more settings to the application.

10. The computer-implemented method of claim 1, further comprising assigning attributes to one or more settings of the second set of settings, wherein the attributes define whether or not the managed device is to apply the one or more settings to the application.

11. The computer-implemented method of claim 1, wherein one or more settings of the second set of settings comprise attributes that define that the managed device is not to apply the one or more settings to the application.

12. The computer-implemented method of claim 1, further comprising the managed device sending the communication as part of a startup routine of the application.

13. The computer-implemented method of claim 1, wherein the second set of settings includes a setting that disables or enables a routine of the application or includes a setting that changes a routine of the application.

14. The computer-implemented method of claim 1, wherein the second set of settings includes a setting that changes a level of detail for logging in the application or includes a setting that disables or enables a logging routine of the application.

15. The computer-implemented method of claim 1, wherein the key-value pair is used by the application having preexisting code to identify how to apply a value of the key-value pair to the application based on a corresponding key of the key-value pair.

16. The computer-implemented method of claim 1, wherein the configuration instructions for a setting of the second set of settings comprises one or more variables for one or more functions of the application.

17. The computer-implemented method of claim 1, further comprising the managed device sending the communication as part of a routine of a software development kit (SDK).

18. The computer-implemented method of claim 1, wherein the second set of settings includes a setting that disables or enables at least one paid feature, function, or routine of the application.

19. A system for remotely managing settings of applications, the system comprising:
one or more data processors; and
one or more computer-readable storage media containing instructions which when executed on the one or more data processors, cause the one or more processors to perform operations including:
receiving a communication from an application on a managed device, the received communication comprising an application identifier of the application and a client-side hash value of a first set of settings of the application;

identifying a server-side hash value of a second set of settings for the application using the application identifier in response to the receiving of the communication, the second set of settings comprising configuration instructions specific to the application identifier and were modified, prior to receiving the communication, in response to input provided via a device associated with the application to debug the application in association with the second set of settings, wherein the device is separate from the managed device; and based on a difference of the received client-side hash value and the server-side hash value, transmitting, to the application on the managed device, a key-value pair representing a setting associated with the second set of settings to replace a first setting associated with the first set of settings causing the application to apply the configuration instructions to modify a configuration of the application.

20. One or more computer-storage media storing computer-useable instructions that, when executed by a computing device, perform a method for remotely managing settings of applications, the method comprising:

receiving a communication from an application on a managed device, the received communication comprising an application identifier of the application and a client-side hash value of a first set of settings of the application;

identifying a server-side hash value of a second set of settings for the application using the application identifier in response to the receiving of the communication, the second set of settings comprising configuration instructions specific to the application identifier and were modified, prior to receiving the communication, in response to input provided via a device associated with the application debug the application in association with the second set of settings, wherein the device is separate from the managed device; and based on a difference of the received client-side hash value and the server-side hash value, transmitting, to the application on the managed device, a key-value pair representing a setting associated with the second set of settings to replace a first setting associated with the first set of settings causing the application to apply the configuration instructions to modify a configuration of the application.

* * * * *